Jan. 16, 1940.    G. A. SHACKELFORD    2,187,181
SPEED PULLEY GENERATOR
Filed Dec. 17, 1937    2 Sheets-Sheet 2
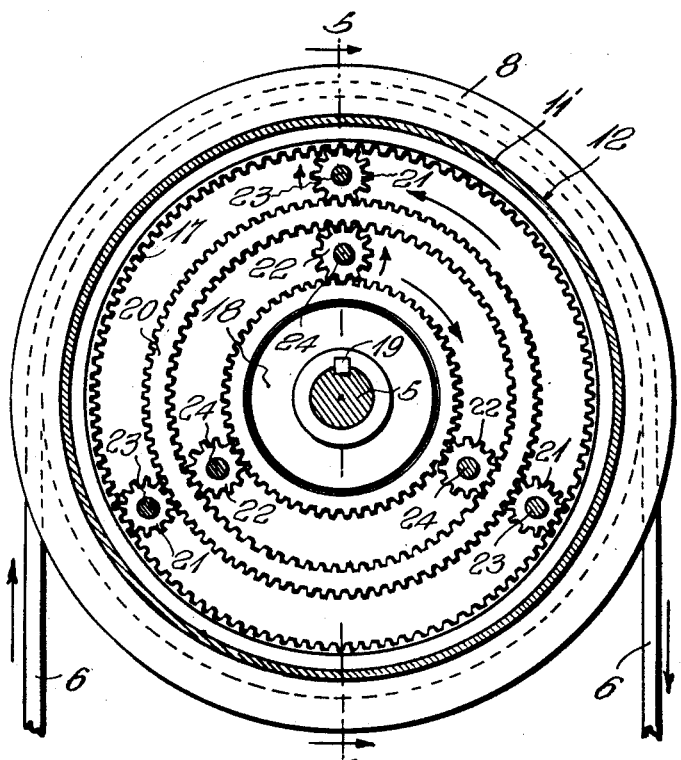
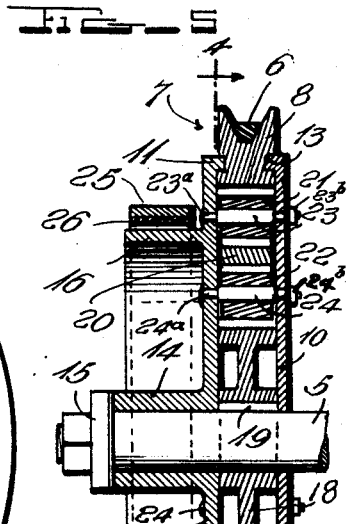
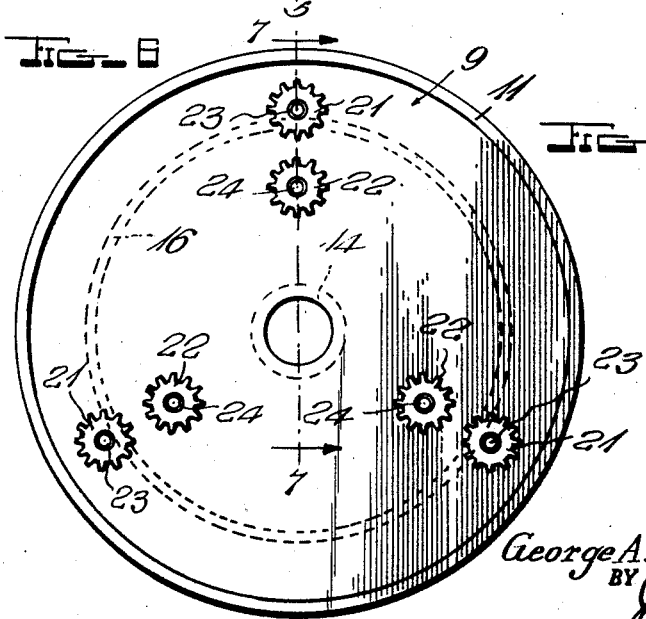
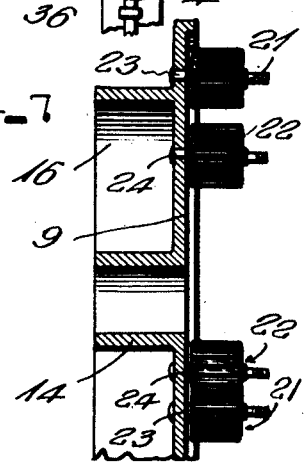
INVENTOR.
George A. Shackelford,
BY
ATTORNEYS.

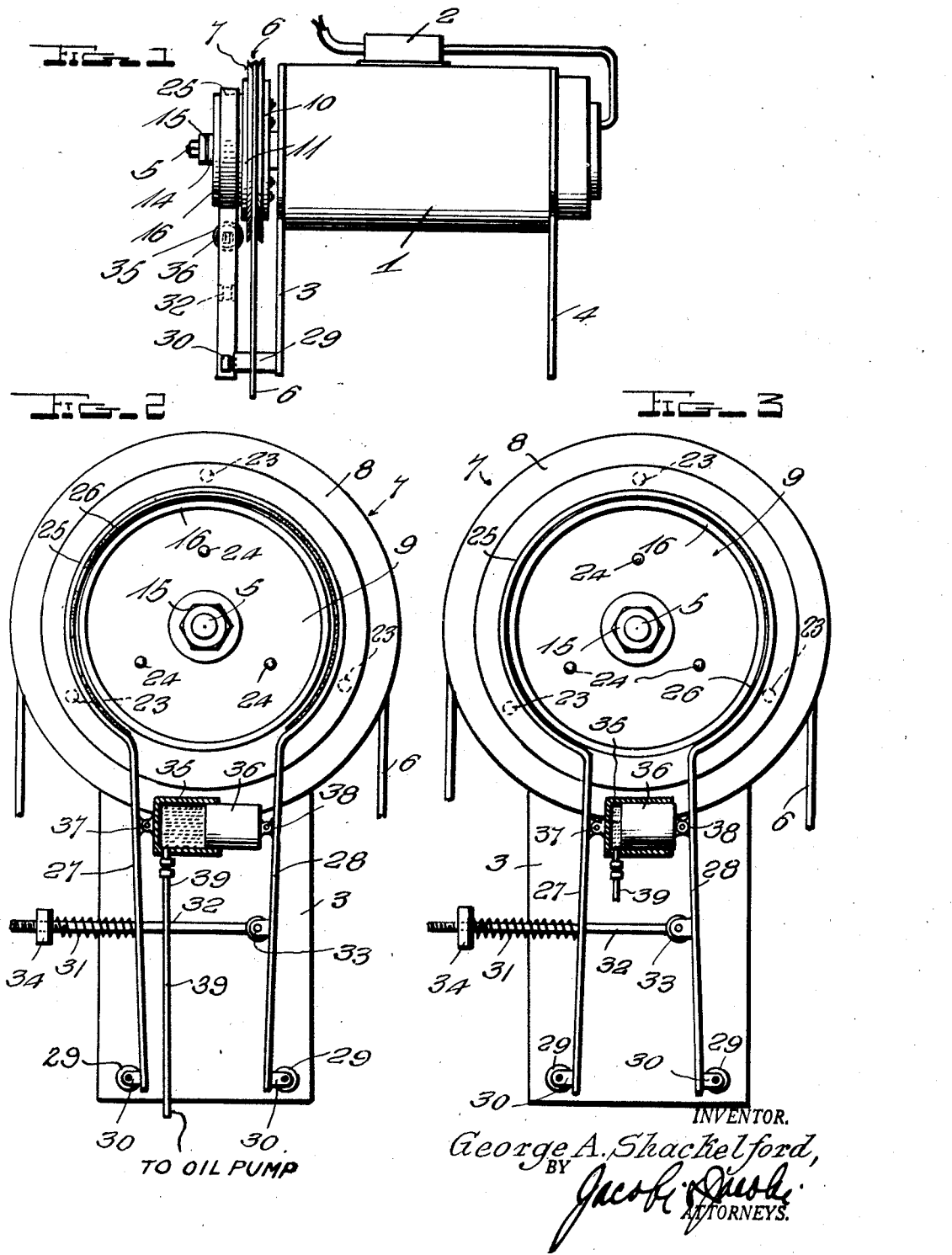

Patented Jan. 16, 1940

2,187,181

UNITED STATES PATENT OFFICE 2,187,181

SPEED PULLEY GENERATOR

George A. Shackelford, New York, N. Y., assignor of one-third to Edward K. Morgan and one-fourth to Dan J. Egan, both of New York, N. Y.

Application December 17, 1937, Serial No. 180,441

5 Claims. (Cl. 74—260)

This invention relates to a speed pulley for a generator and more particularly to a pulley of such construction that although the speed at which the pulley rotates may vary, the generator shaft to which the pulley is applied will always rotate at sufficient speed to operate the generator and cause charging of a battery.

When an automobile is driven steadily at speed of at least 15 miles per hour a generator of a conventional construction will charge the battery but when driving through heavy traffic or in cities, the speed of the automobile must be slowed down due to the traffic or because of adverse traffic lights and under these conditions the generator shaft is not turned at a sufficiently high rate of speed to replenish the battery. Therefore exhaustion of the battery due to lack of charging will occur whereas if the generator shaft were at all times turned at a sufficiently high rate of speed the battery would be kept properly charged and stopping of the automobile due to lack of current avoided.

It is therefore one object of the invention to provide the generator shaft with a pulley by means of which the shaft will at all times be rotated at such a speed that the generator will properly charge the battery.

Another object of the invention is to provide the pulley with planetary gearing having a clutch associated therewith and so constructed that it will automatically respond to changes in speed at which the automobile engine is running and cause the generator shaft to turn either at the same speed as the pulley or at an increased speed and cause charging of the battery to continue when the automobile engine is running at slow speed.

Another object of the invention is to provide the pulley with a clutch yieldably held in a contracted or binding position and adapted to be released when subjected to a predetermined fluid pressure developed when the automobile is traveling at a rate of speed which is assumed to be at least 15 miles per hour, although any arbitrary speed may control releasing of the clutch.

Still another object of the invention resides in providing a device which is simple and durable in construction, inexpensive to manufacture and one which will be very efficient in operation and application to use.

With these and numerous other objects in view, my invention consists in the novel features of construction, combination and arrangement of parts as will be hereinafter referred to and more particularly pointed out in the specification and claims.

The invention is illustrated in the accompanying drawings wherein:

Figure 1 is a side elevation of a generator provided with the improved pulley;

Figure 2 is a front elevation upon an enlarged scale showing the band of the clutch in the drum releasing condition existing when the automobile in which the generator is installed is traveling at a speed sufficient to cause charging of the battery when the generator shaft and its pulley are turning at the same rate of speed;

Figure 3 is a view similar to Figure 2 but showing the band in clutching engagement with the drum whereby the generator shaft may be caused to rotate at a higher speed than the pulley and charging of the battery effected while the automobile is traveling at a reduced speed;

Figure 4 is a sectional view of the clutch taken along the line 4—4 of Figure 5;

Figure 5 is a sectional view taken vertically through the clutch along the line 5—5 of Figure 4;

Figure 6 is a view looking at the inner face of the drum carrying plate of the clutch; and Figure 7 is a fragmentary sectional view taken along the line 7—7 of Figure 6.

The generator which is indicated in general by the numeral 1 is of a conventional construction and includes the usual cut out 2. Front and rear legs or struts 3 and 4 are provided to support the generator and the generator also includes the usual shaft 5 to which rotary motion is to be imparted in order that the generator may function and a battery charged in the usual manner. At the present time rotary motion is imparted to the generator shaft through the medium of a belt 6 trained about a pulley fixed to the shaft but this has been found unsatisfactory as the pulleys now in use are of a unitary construction and the generator shaft always turns at the same speed as the pulley. When the engine is running at high speed and the automobile traveling at a rate of 15 miles per hour or more the generator shaft will be turned at a sufficiently high rate of speed to charge the battery but when it is necessary to travel at a reduced speed due to congested traffic or adverse traffic signals in a city the engine is slowed down and as the pulley and the generator shaft rotate at the same rate of speed, rotation of the generator shaft will not be at a high enough rate to generate electricity and charge the battery. Therefore current drawn from the battery to operate the engine and lights of the automobile will exhaust the battery and operation of the automobile will not be possible.

In order to overcome this objection and permit the battery to be kept charged while driving through a city having traffic lights or along a road subjected to heavy traffic there has been provided a pulley 7 of special construction having planetary gearing and a clutch associated therewith. This pulley has a rim 8 which has its outer peripherial edge face grooved to receive the belt 6 and prevent the belt from slipping off of the pulley. Side plates or disks 9 and 10 are disposed at opposite sides of the rim 8, the disk 9 being formed with a marginal flange 11 for engaging in an annular groove 12 formed in one side face of the rim, and the disk 10 being formed with a marginal flange 13 engaging in an annular groove 13' formed in the other side face of the rim. The disks may turn with the rim due to a certain amount of frictional binding between the ribs and walls of the grooves but when the disks are held stationary the rim will turn relative to the disks. A hub 14 extends outwardly from the center of the disk 9 for snug fit about the generator shaft 5 and since this hub is engaged by the nut 15 applied to the end of the shaft the pulley will be retained in place about the shaft and the disks 9 and 10 prevented from shifting longitudinally of the shaft out of engagement with the rim 8. The disk 9 also carries a drum 16 extending from the outer face thereof concentric to the disk but in spaced relation to the periphery thereof.

The rim 8 together with the disks 9 and 10 form a hollow pulley defining a chamber in which planetary gearing is mounted as shown in Figures 4 and 5. The outer gear ring 17 of the planetary gearing is preferably formed integral with the rim but it is to be understood that it may be formed separate from the rim and rigidly secured therein in any desired manner. The center gear or pinion 18 is keyed to the shaft 5 as shown at 19 and intermediate the gears 17 and 19 there has been shown a floating gear ring 20 which is concentric to the gears 17 and 18. Between the gear ring 20 and the gears 17 and 18 fit small gears or pinions 21 and 22 arranged in pairs as shown in Figures 4 and 6 and rotatably supported by axles 23 and 24 having reduced ends engaged through openings formed in the disks 9 and 10. The reduced ends which pass through the disk 9 are upset to form heads 23ᵃ and 24ᵃ serving to hold the axles anchored to the disk 9 and the reduced ends passing through the disk 10 carry nuts 23ᵇ and 24ᵇ. When the nuts are removed the disks can be detached from the rim 8 but the axles will remain anchored to the disk 9 as shown in Figure 7 and the gears 21 and 22 may remain upon the axles or be removed therefrom for cleaning or replacement of parts when necessary. As the reduced ends of the axles pass through both disks 9 and 10, the disks will turn as a unit or both be held stationary when a band engaged about the drum is contracted for gripping engagement therewith. While three sets of gears 23 and 24 have been shown it is to be understood that any number of two or more may be provided, it being also understood that more than one floating ring gear may be provided, in which case one or more additional gears 21 and 22 must also be provided for each set. This planetary gearing acts in the usual manner and it will be readily understood that when the disks are free to turn with the rim, the planetary gearing and the rim and disks forming the pulley will turn as a unit and the generator shaft 5 will turn at the same rate of speed as the pulley. When the engine is running at high speed, and the generator shaft turning at the same speed as the pulley, the speed will be sufficient to generate enough electricity to keep the battery charged but when the speed of the engine is reduced, as when stopping for adverse traffic lights or reducing the speed of the automobile to less than 15 miles an hour in heavy traffic, the generator will not be able to keep the battery charged unless the generator shaft is rotated at the previous speed. This is impossible unless the speed of the shaft is stepped up higher than that of the pulley.

In order to permit the speed of the generator shaft to be stepped up to a speed appreciably higher than that of the pulley the disks 9 and 10 must be held stationary so that as the rim 8 of the pulley rotates, rotary motion will be transmitted at progressively increased speeds by way of the pinions and the floating gear ring to the center gear 18 which is keyed to the generator shaft, and the generator shaft will rotate at a speed sufficient to cause the battery to be charged and thus prevented from being exhausted. The means for holding the disks stationary is illustrated in Figures 2, 3 and 5 and referring to these figures it will be seen that this means consists of a brake band 25 resembling a brake band used upon automobiles. This band is engaged about the drum 16 and lined as shown at 26 so that slippage will not occur when the band is tightened about the drum. End portions of the strip of resilient metal from which the brake band is formed are bent to provide arms 27 and 28 which extend downwardly from the drum encircling loop and have their lower ends anchored to posts 29 projecting forwardly from the lower end of the front leg 3 near opposite side edges thereof. The ears 30 of the arms which are secured to ends of the posts 29 are pivoted so that while the arms will be held to the posts they will be permitted to have sufficient give to permit the loop of the brake band to be contracted about the drum and firmly grip the drum. When the engine is running at reduced speed the band is to be contracted about the drum and grip the same to hold the disks 9 and 10 stationary and in order to do so there has been provided a spring 31 coiled about a stem 32 formed of a metal rod pivoted to the arm 28 as shown at 33 and slidably engaged through an opening formed in the arm 27. A nut 34 is threaded upon the free end of the stem 32 to serve as an adjustable abutment for the outer end of the spring 31 and by adjusting this nut along the stem tension of the spring can be regulated. It will thus be seen that the grip of the loop about the drum may be controlled. When the engine is running at high speed the brake band must be held out of gripping engagement with the drum and in order to do so there has been provided hydraulic means consisting of a cup or cylinder 35 in which operates a piston 36. The cup and the piston are pivoted to the arms 27 and 28 as shown at 37 and 38 and in order that oil may be fed to the cylinder there has been provided a pipe 39 leading from a suitable pump (not shown) operated by the automobile engine and so constructed that when the engine is running at high speed pressure of the oil will force the piston out of the cylinder to the position shown in Figure 2, while reduced speed of the engine will permit the oil to be forced back from the cylinder through the pipe. It will thus be seen that during running of the engine at high speed the arms of the brake band will be forced away from each other to the position shown in Figure 2 and the drum released so that the generator shaft turns at the same speed as the pulley, and that when the engine speed is reduced the spring 31 will move the arms towards each other and the drum gripped by the band to hold the disks 9 and 10 stationary while the rim 8 continues to rotate and thus cause the planetary gearing to step up the speed of the generator shaft and cause the generator to continue operation at a speed sufficient to charge the battery. Therefore the generator will charge the battery when the engine is running at either high or low speed and failure of the battery due to insufficient charging when an automobile is driven at slow speed will not occur.

From the foregoing description of the construction of my improved device, the operation thereof and the method of applying the same to use will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

Having thus described the invention what is claimed is:

1. In a device of the character described, a rotary shaft, a pulley about said shaft having a belt engaging rim and side disks, said disks having loose engagement with said rim, planetary gearing housed in said pulley and including a center gear fixed to the shaft and rotatable pinions having axles carried by the disks, a drum projecting from the outer side face of one disk concentric to the pulley and shaft, a brake band engaged about said drum and having arms extending therefrom, yieldable means for urging said arms towards each other and tightening the brake band about the drum to hold the disks stationary, and fluid pressure actuated means for shifting the arms away from each other and spreading the brake band to release the drum and permit turning of the disks with the rim.

2. In a device of the character described, a rotary shaft, a pulley about said shaft having a belt engaging rim and side disks, said disks having loose engagement with the rim, planetary gearing housed in said pulley and including a center gear fixed to the shaft and rotatable pinions carried by the disks, a drum projecting from the outer side face of one disk concentric to the pulley and shaft, a brake band engaged about said drum and having arms extending therefrom, a rod carried by one arm and extending laterally therefrom and loosely engaged through the other arm, an abutment threaded upon the free end portion of said rod, a spring coiled about said rod between the abutment and the last mentioned arm for urging said arms towards each other and tightening the brake band about the drum to hold the disks stationary, and fluid pressure actuated means for shifting the arms away from each other and spreading the brake band to release the drum and permit turning of the disks with the rim.

3. In a device of the character described, a rotary shaft, a pulley about said shaft having a belt engaging rim and side disks, said disks having loose engagement with said rim, planetary gearing housed in said pulley and including a center gear fixed to the shaft and pinions rotatably mounted between said disks, a drum projecting from the outer side face of one disk concentric to the pulley and the shaft, a brake band engaged about said drum and having arms extending therefrom, yieldable means for urging said arms towards each other and tightening the brake band about the drum to hold the disks stationary, and means for spreading the band to release the drum and permit turning of the disks with the rim consisting of a cylinder carried by one arm, a piston carried by the other arm and engaged in said cylinder, and a tube for delivering liquid under pressure into the cylinder and exerting pressure to spread the arms and band out of a gripping position.

4. In combination, a rotary driven member, a driving means having a lubricating system whose pressure varies with speed of the driving means, a change speed mechanism for transmitting rotary motion between said rotary driven member and driving means, and brake means for controlling the change speed mechanism having actuating means responsive to variations in pressure of lubricant in the lubricating system during changes in speed of the driving means, the said actuating means including arms movable relative to each other, a cylinder carried by one arm, a piston movable in said cylinder and carried by the other arm, and means for establishing communication between the cylinder and the lubricating system whereby pressure of the lubricant may cause movement of the piston in the cylinder.

5. In combination, a rotary driven member, a driving means having a lubricating system whose pressure varies with speed of the driving means, a change speed mechanism for transmitting rotary motion between said rotary driven member and driving means, and brake means for controlling the change speed mechanism having actuating means responsive to variations in pressure of lubricant in the lubricating system during changes in speed of the driving means, the said actuating means including arms movable toward and away from each other for tightening and loosening the brake means, resilient means urging said arms toward each other for tightening the brake means, a cylinder carried by one arm, a piston carried by the other arm and slidably received in said cylinder, and a tube for conducting lubricant under pressure from the lubricating system into said cylinder.

GEORGE A. SHACKELFORD.